W. O. LUM.
ELECTRICAL SYSTEM.
APPLICATION FILED MAY 6, 1915.
1,318,779.
Patented Oct. 14, 1919.
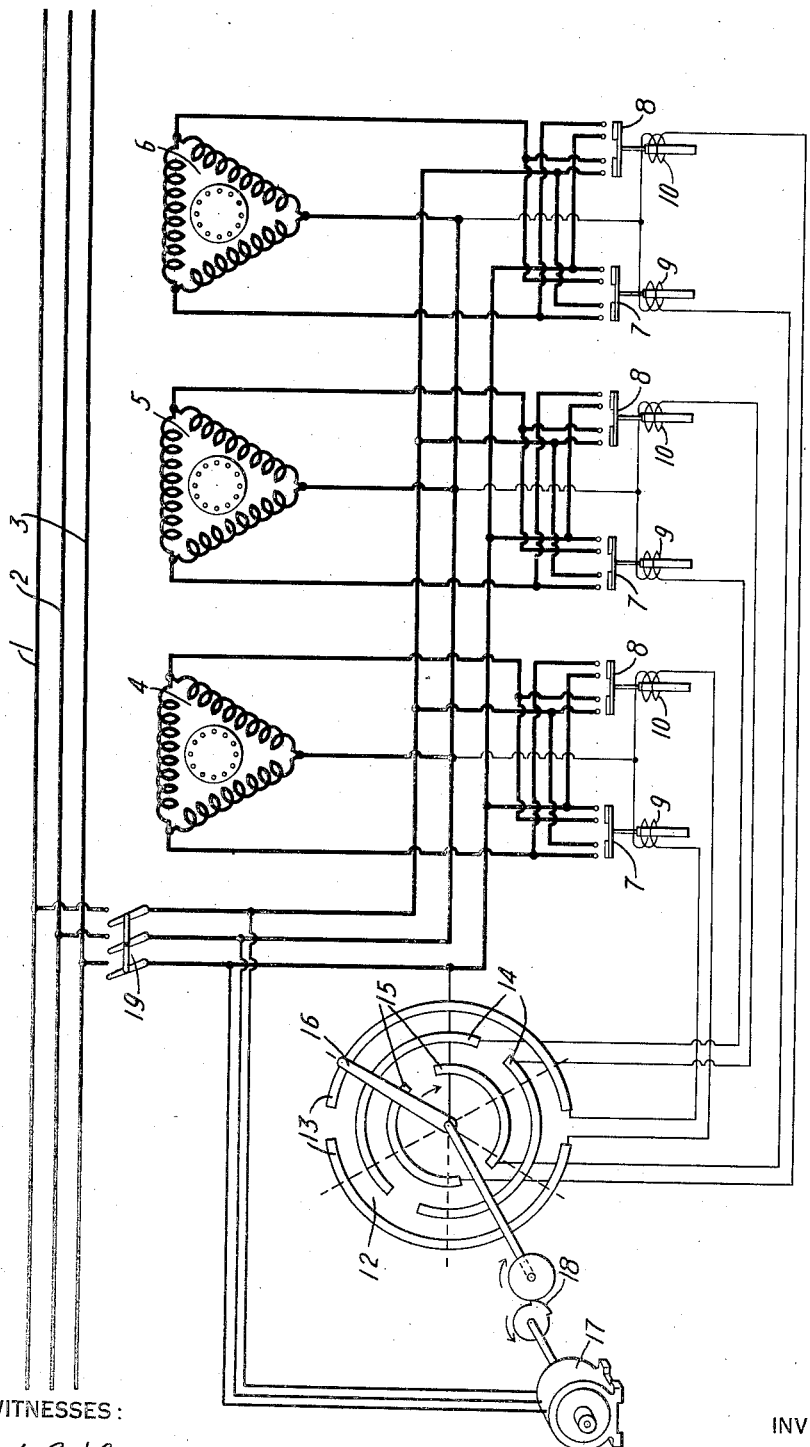
WITNESSES:
Fred. A. Lind.
J. R. Langley
INVENTOR
Walter O. Lum
BY
Wesley G. Carr
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,318,779.     Specification of Letters Patent.     Patented Oct. 14, 1919.

Application filed May 6, 1915. Serial No. 26,303.

*To all whom it may concern:*

Be it known that I, WALTER O. LUM, a citizen of the United States, and a residenc of Wilkinsburg, in the county of Allegheny and State of Pennsylvania, have invented a new and useful Improvement in Electrical Systems, of which the following is a specification.

My invention relates to electrical systems, and it has for its object to provide a simple arrangement whereby a plurality of electric motors may be periodically and successively reversed.

It is frequently the case that a single supply circuit furnishes current both to illuminating devices and to a number of electric motors for operating machines that are periodically reversed. In such cases, it is desirable that some means be provided whereby the driving motors are not reversed simultaneously in order that the voltage of the supply circuit may not be lowered to such a degree that the lamps supplied by the circuit are caused to flicker.

I provide a system in which a plurality of electric motors are periodically and successively reversed automatically. In its broadest aspect, my invention comprises a number of electric motors, each of which is provided with reversing switches that are controlled by an intermittently actuated controller.

The details of my invention will be described in connection with the accompanying drawing, in which the single figure is a diagrammatic view of circuits and apparatus embodying my invention.

Line conductors 1, 2 and 3, which may be connected to any suitable source of alternating current, supply current to any convenient number of electric motors, three motors 4, 5 and 6 being shown by way of example. It may be assumed that the several motors are operatively connected, for example, to laundry machines or other machines requiring periodic reversal of the driving motors.

The circuit of each of the motors 4, 5 and 6 is controlled by reversing switches 7 and 8 that are respectively provided with actuating coils 9 and 10. A controller 12, which governs the circuits of the several coils 9 and 10 comprises a plurality of pairs of concentrically disposed curved contact segments. The ends of the several contact segments are separated by gaps of such length that they cannot be bridged by a movable contact arm which coacts with the segments. The gaps, which separate the ends of the several pairs of contact segments, are displaced from each other by substantially equal angles. Since the gaps are six in number, they will be separated by angles of approximately 60°. The members of a pair of contact segments 13 forming the outer ring of the controller, are respectively connected to the coils 9 and 10 of the switches 7 and 8 for controlling the circuit of the motor 4.

Similar pairs of contact segments 14 and 15 are respectively connected to the actuating coils 9 and 10 of the reversing switches for the motors 5 and 6. A rotatable contact arm 16, which coacts with the several contact segments, is actuated by an electric motor 17 to which it is connected by means of an intermittent gear mechanism 18.

It may be assumed that the several switches are in their illustrated, or inoperative, positions, and that the controller arm 16 occupies its illustrated position. It may be assumed, further, that a main switch 19 has been closed to complete a circuit which extends from the line conductor 3 through contact arm 16, contact segment 13, and actuating coil 9 to line conductor 2. A circuit is also completed which extends from the contact arm 16, through contact segment 14 and actuating coil 9 of reversing switch 7 for motor 5 to line conductor 2. A circuit extends, also, from the arm 16 through a contact segment 15 and coil 10 of reversing switch 8 for the motor 6, to line conductor 2.

Reversing switches 7 for the motors 4 and 5 and reversing switch 8 for the motor 6 are closed upon the energizing of their respective actuating coils by means of the circuits above described. The closing of the main switch 19 completes a circuit for the pilot motor 17, and the latter rotates in a counterclockwise direction to drive the contact arm 16 in a clockwise direction by means of the intermittent gear mechanism. The intermittent gear mechanism 18 is arranged to actuate the contact arm 16 through approximately 60° of its path of movement at each engagement of the mechanism. The arm is arranged to cross one of the gaps between the ends of a pair of contact segments during each of its periodic movements.

When the contact arm 16 is actuated from its illustrated position, it comes to rest when it is in a substantially horizontal position. The circuit of the coil 10 of the reversing switch 8 for the motor 6 is opened at one of the contact segments 15 and a circuit for the coil 9 of the corresponding reversing switch 7 is closed at the other contact segment 15. The motor 6 then rotates in the reverse direction. The motors 4 and 5, however, continue to rotate in the same direction because the contact arm 16 remains in engagement with the same contact segments 13 and 14 with which it coacts in its illustrated position.

Upon a succeeding engagement of the intermittent gear mechanism 18, the contact arm 16 coacts with the contact segments 14 to reverse the motor 5 in a similar manner. When an operative connection is again established between the motor 17 and the contact arm 16, the motor 4 is similarly reversed. When the controller arm 16 is actuated to a horizontal position, the motor 6 is reversed in the same manner as that above described. The several positions in which the controller arm is stationary are indicated by dotted lines.

While a system comprising three electric motors and a controller having three pairs of contact segments for controlling the direction of rotation of the motor have been shown and described, it will be understood that the number of such parts may be any desired, the present arrangement being shown by way of example only. It will be understood, further, that the applicant is not limited to the specific number of contact segments nor to the angle through which the controller arm is actuated during each engagement of the intermittent gear mechanism.

The employment of a controller that is intermittently actuated is of advantage in that the arm may be actuated quickly from one position to another in order to secure quick makes and breaks of the controlled circuits. This result cannot be obtained by the use of a continuously operated controller which must operate slowly to permit each motor to operate the required period of time in each direction.

It will be obvious that many other modifications may occur to those skilled in the art to which my invention appertains, and it is understood that such changes may be made as fall within the scope of the appended claims without departing from the spirit of my invention.

I claim as my invention:

1. In a motor control system, the combination with a plurality of electric motors, of means for periodically and successively reversing said motors, said means comprising a controller having a movable member and means for intermittently actuating said member in a single direction.

2. In a motor control system, the combination with a plurality of electric motors, of means for periodically and successively reversing said motors, said means comprising a controller, and an intermittent gear mechanism operatively connected thereto for actuating the movable element of said controller in a single direction.

3. In a motor-control system, the combination with a plurality of electric motors, and a plurality of switches for periodically and successively reversing said motors, of a controller having a plurality of groups of contact members, electrical connections between the members of each group and the switches of one of said motors, the members of each group of contact members being spaced apart by substantially equal distances, a contact arm for coacting with said contact members, and means for intermittently actuating said arm.

4. In a motor control system, the combination with a plurality of electric motors, of means for periodically and successively reversing said motors, said means comprising a controller having a plurality of concentrically disposed groups of contact members in the same plane for controlling the circuits of the respective motors, a relatively movable contact member for coacting with said contact members, and means for intermittently moving said movable contact member.

5. In a motor control system, the combination with a plurality of electric motors, of means for periodically and successively reversing said motors, said means comprising a controller having a plurality of contact members for controlling the circuits of the respective motors, a relatively movable contact arm for successively engaging said contact members, and means for intermittently actuating said contact arm.

6. In a motor control system, the combination with a plurality of electric motors, of means for periodically and successively reversing the connections of said motors, said means comprising a plurality of contact members for controlling the circuits of the respective motors, a relatively movable arm for successively engaging said contact members, and means for intermittently actuating said arm in a single direction.

7. In a motor control system, the combination with a plurality of electric motors, of means for periodically and successively reversing the connections of said motors, said means comprising a plurality of reversing switches in circuit with said motors and a controller having a member intermittently movable in a single direction.

8. A controller comprising a plurality of staggered contact members of equal effective length, a movable arm adapted to bridge said members, and means for automatically moving said arm intermittently and quickly a limited distance to periodically and successively break the bridge with one of said members and make the bridge with another of said members.

9. A controller comprising a plurality of concentric pairs of approximately semi-circular, contact segments, the ends of the segments of each pair being equi-angularly spaced with the ends of the segments of the other pairs, an arm pivoted at the center of said segments and adapted to make electrical contact with said segments at all points except between said ends, and means for automatically moving said arm intermittently and quickly across the angular space between the adjacent ends of the segments of each pair.

In testimony whereof I have hereunto subscribed my name this 30th day of April, 1915.

WALTER O. LUM.